(12) United States Patent
Steely, Jr. et al.

(10) Patent No.: US 7,380,107 B2
(45) Date of Patent: May 27, 2008

(54) MULTI-PROCESSOR SYSTEM UTILIZING CONCURRENT SPECULATIVE SOURCE REQUEST AND SYSTEM SOURCE REQUEST IN RESPONSE TO CACHE MISS

(75) Inventors: Simon C. Steely, Jr., Hudson, NH (US); Gregory Edward Tierney, Chelmsford, MA (US); Stephen R. Van Doren, Northborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 10/756,640

(22) Filed: Jan. 13, 2004

(65) Prior Publication Data
US 2005/0154863 A1    Jul. 14, 2005

(51) Int. Cl.
*G06F 15/00* (2006.01)
(52) U.S. Cl. .................. 712/225; 712/215; 712/216; 711/141
(58) Field of Classification Search ........... 712/225, 712/216, 215; 711/141
See application file for complete search history.

(56) References Cited

U.S. PATENT DOCUMENTS

| | | | |
|---|---|---|---|
| 5,197,132 A | 3/1993 | Steely, Jr. et al. |
| 5,222,224 A | 6/1993 | Flynn et al. |
| 5,404,483 A | 4/1995 | Stamm et al. |
| 5,519,841 A | 5/1996 | Sager et al. |
| 5,625,829 A | 4/1997 | Gephardt et al. |
| 5,721,855 A | 2/1998 | Hinton et al. |
| 5,802,577 A | 9/1998 | Bhat et al. |
| 5,829,040 A | 10/1998 | Son |
| 5,845,101 A | 12/1998 | Johnson et al. |
| 5,875,467 A | 2/1999 | Merchant |
| 5,875,472 A | 2/1999 | Bauman et al. |
| 5,958,019 A | 9/1999 | Hagersten et al. |
| 6,032,231 A | 2/2000 | Gujral |
| 6,055,605 A | 4/2000 | Sharma et al. |
| 6,081,887 A | 6/2000 | Steely, Jr. et al. |
| 6,085,263 A | 7/2000 | Sharma et al. |
| 6,108,737 A | 8/2000 | Sharma et al. |
| 6,134,646 A | 10/2000 | Feiste et al. |
| 6,151,671 A | 11/2000 | D'Sa et al. |
| 6,209,065 B1 | 3/2001 | Van Doren et al. |
| 6,286,090 B1 | 9/2001 | Steely, Jr. et al. |
| 6,301,654 B1 | 10/2001 | Ronchetti et al. |
| 6,317,811 B1 | 11/2001 | Deshpande et al. |
| 6,345,342 B1 | 2/2002 | Arimilli et al. |

(Continued)

OTHER PUBLICATIONS

Gharachorloo, et al., "Memory Consistency and Event Ordering in Scalable Shared-Memory Multiprocessors", Computer Systems Laboratory, Stanford University, CA 94305, pp. 1-14.

(Continued)

*Primary Examiner*—Tonia L. M. Dollinger

(57) ABSTRACT

Multi-processor systems and methods are disclosed that employ speculative source requests to obtain speculative data fills in response to a cache miss. In one embodiment, a source processor generates a speculative source request and a system source request in response to a cache miss. At least one processor provides a speculative data fill to a source processor in response to the speculative source request. The processor system provides a coherent data fill to the processor in response to the system source request.

30 Claims, 5 Drawing Sheets

U.S. PATENT DOCUMENTS

| | | |
|---|---|---|
| 6,349,366 B1 * | 2/2002 | Razdan et al. ............... 711/141 |
| 6,349,382 B1 | 2/2002 | Feiste et al. |
| 6,356,918 B1 | 3/2002 | Chuang et al. |
| 6,408,363 B1 | 6/2002 | Lesartre et al. |
| 6,412,067 B1 | 6/2002 | Ramirez et al. |
| 6,457,101 B1 | 9/2002 | Bauman et al. |
| 6,535,941 B1 | 3/2003 | Kruse |
| 6,553,480 B1 | 4/2003 | Cheong et al. |
| 6,567,900 B1 * | 5/2003 | Kessler ....................... 711/157 |
| 6,574,712 B1 | 6/2003 | Kahle et al. |
| 6,591,348 B1 | 7/2003 | Deshpande et al. |
| 6,594,821 B1 | 7/2003 | Banning et al. |
| 6,615,343 B1 | 9/2003 | Talcott et al. |
| 6,633,960 B1 | 10/2003 | Kessler et al. |
| 6,633,970 B1 | 10/2003 | Clift et al. |
| 6,651,143 B2 | 11/2003 | Mounes-Toussi |
| 2001/0055277 A1 | 12/2001 | Steely, Jr. et al. |
| 2002/0009095 A1 | 1/2002 | Van Doren et al. |
| 2002/0099833 A1 | 7/2002 | Steely, Jr. et al. |
| 2002/0099913 A1 | 7/2002 | Steely, Jr. |
| 2002/0146022 A1 | 10/2002 | Van Doren et al. |
| 2002/0194290 A1 | 12/2002 | Steely, Jr. et al. |
| 2002/0194436 A1 | 12/2002 | McKenney |
| 2002/0199067 A1 * | 12/2002 | Patel et al. .................. 711/145 |
| 2003/0069902 A1 | 4/2003 | Narang et al. |
| 2003/0145136 A1 | 7/2003 | Tierney et al. |
| 2003/0195939 A1 | 10/2003 | Edirisooriya et al. |

OTHER PUBLICATIONS

Gharachorloo, et al., "Architecture and Design of AlphaServer GS320", pp. 1-16.

* cited by examiner

MULTI-PROCESSOR SYSTEM UTILIZING CONCURRENT SPECULATIVE SOURCE REQUEST AND SYSTEM SOURCE REQUEST IN RESPONSE TO CACHE MISS

CROSS REFERENCE TO RELATED APPLICATIONS

This application is related to the following commonly assigned co-pending patent applications entitled: "COHERENT SIGNAL IN A MULTI-PROCESSOR SYSTEM," 10/756,636; "MULTI-PROCESSOR SYSTEMS AND METHODS FOR BACKUP FOR NON-COHERENT SPECULATIVE FILLS," 10/756,637; "CACHE SYSTEMS AND METHODS FOR EMPLOYING SPECULATIVE FILLS," 10/756,638; "REGISTER FILE SYSTEMS AND METHODS FOR EMPLOYING SPECULATIVE FILLS," 10/756,644; "SYSTEMS AND METHODS FOR EXECUTING ACROSS AT LEAST ONE MEMORY BARRIER EMPLOYING SPECULATIVE FILLS," 10/756,639; "MULTI-PROCESSOR SYSTEM RECEIVING INPUT FROM A PRE-FETCH BUFFER," 10/756,535; "SOURCE REQUEST ARBITRATION," 10/755,919; "SYSTEMS AND METHODS FOR EMPLOYING SPECULATIVE FILLS," 10/755,938; "CONSISTENCY EVALUATION OF PROGRAM EXECUTION ACROSS AT LEAST ONE MEMORY BARRIER," 10/756,534, all of which are filed contemporaneously herewith and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

SUMMARY

One embodiment of the present invention may comprise a multi-processor system. A source processor generates a speculative source request and a system source request in response to a cache miss. At least one processor provides a speculative data fill to a source processor in response to the speculative source request. The processor system provides a coherent data fill to the processor in response to the system source request.

Another embodiment of the present invention may comprise a system having a source processor and at least one other processor. The other processors provide a speculative data fill to a source processor in response to a first request broadcast within a local interconnect. The system provides a coherent data fill to the source processor in response to a second request. The second request is provided through a system interconnect.

Still another embodiment of the present invention may comprise a method for obtaining a data fill in response to a cache miss. A first source request for a memory block may be transmitted from a source location to obtain a speculative data fill of the memory block. A second source request for a memory block may be transmitted from the source location to obtain at least one copy of the memory block. It may be determined if the speculative data fill is coherent based on the at least one copy of the memory block.

Yet another embodiment of the present invention may comprise a multi-processor system. The multi-processor system may comprise means for executing program instructions. The system may further comprise means for retrieving a data fill from at least one target processor and means for determining it the data fill received from the target processor represents coherent data. The system may also comprise means for providing a coherent copy of the data fill to the structure or structures for executing program instructions if the data fill from the target processor does not represent coherent data.

DETAILED DESCRIPTION

This disclosure relates generally to multi-processor communication systems and methods. The systems and methods allow a source processor to obtain speculative data fills from one or more processors in response to a speculative source request. The source processor can employ one or more speculative fills or copies of the requested data to continue instruction execution, until the coherent signal is returned. A coherent copy of the data can be requested through a system source request. Once the coherent copy is returned, the source can continue execution if the speculative fill is the same as the coherent fill or backup and re-execute instructions if the speculative fill is different from the coherent fill. The systems and methods can be employed in multi-processor system utilizing a cache coherency protocol. The coherent signal can be part of or work in cooperation with the cache coherency protocol.

Figure 1:
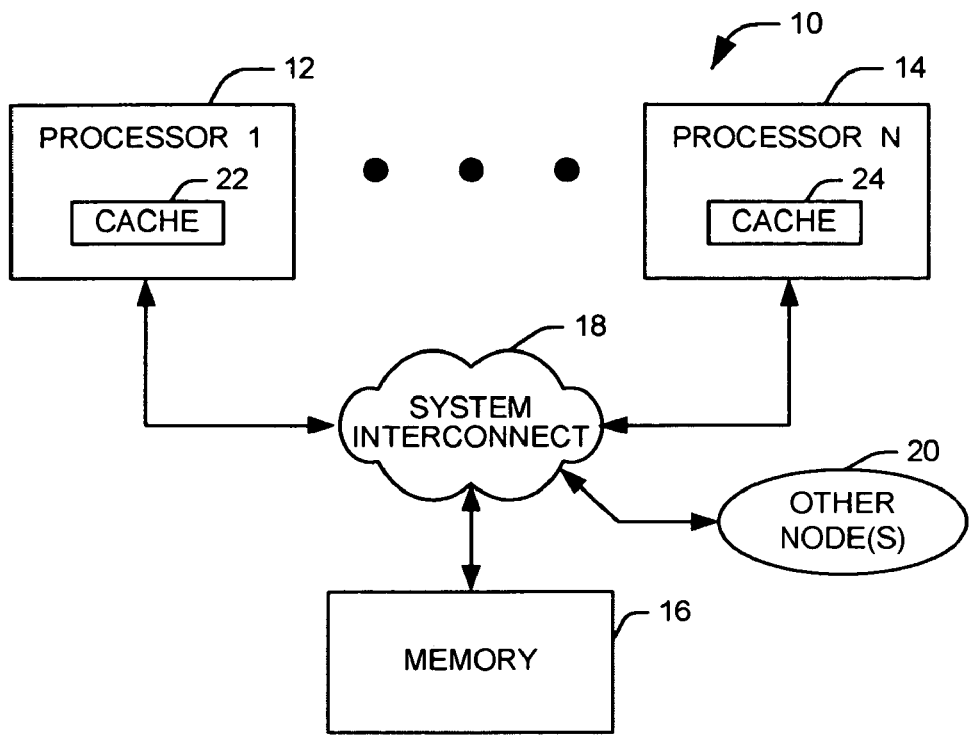
FIG. 1 depicts an example of a multiprocessor system.

FIG. 1 depicts an example of a system 10 that utilizes a speculative source request to obtain data fills for a source processor. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. The system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22 and 24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherency of data. The cache coherency protocol of the system 10 utilizes a plurality of states to identify the state of each memory block stored in a respective cache line and the memory 16. The cache coherency protocol establishes rules for transitioning between states, such as if data is read from or written to memory 16 or one of the caches 22-24. The system 10 can utilize any of a number of suitable cache coherency protocols, including a broadcast based protocol, a directory based protocol, or a null based directory protocol.

As used herein, a processor that issues a source request, such as a read or write request, defines a source processor. Other processors and nodes within the system 10 can provide responses to the source request from associated memory structures. For example, when a source processor 12 requires a copy of a given memory block, it typically first requests the memory block from its local, private cache by identifying the address associated with the memory block. If the data is found locally, the memory access is resolved without communication via the system interconnect 18. Where the requested memory block is not found locally, a cache miss is recorded and the source processor 12 can request the memory block from the system 10, including the memory 16. In addition to the request identifying an address associated with the requested memory block, the request usually identifies the type of request or command being issued by the requester.

The source processor can send out two distinct requests to obtain the desired memory block in response to a cache miss. The requests can be sent out sequentially or in parallel. One request is a speculative source request provided to one or more processors associated with the system. For example, a given source processor can have one or more associated target processors that receive the speculative source request. The targeted processors associated with a given source processor can be predetermined in the design of the system. For example, target processors can be selected to have qualities ensuring low response times for requests from the source processor, such as spatial proximity to the source or desirable bandwidth properties. Alternatively, one or more desirable target processors for each source processor can be provided and dynamically updated by the system through the system interconnect. The speculative source request can also be provided generally to each processor and node in the system.

In response to the speculative request, the receiving processors determine if its associated cache contains a copy of the desired memory block. Any processor having a copy of the desired memory block can provide the block as a data fill to the source processor. The speculative request and the corresponding data fill execute independently from the cache coherency protocol of the system. Accordingly, it is uncertain whether a given data fill offered in response to the speculative request is the latest version (e.g., a coherent copy) of the desired memory block. A data fill that may or may not be a coherent copy of the memory block is referred to as a speculative data fill. Providing a speculative fill to the source processor allows the processor to continue executing program instructions associated with the data fill during the time required to obtain a coherent copy of the data fill. For example, the source processor may be able to execute several thousands of program instructions associated with the speculative fill prior to receiving a coherent copy of the requested memory block. It will be appreciated that a speculative fill will not always be available from the processors receiving the speculative request. In such a case, a coherent fill can be obtained in accordance with the cache coherency protocol of the system.

The source processor also provides a system source request in response to a cache miss. In response to the cache miss, the system 10 can provide one or more additional data fills to the system, including a coherent data fill. The location of the coherent data fill is provided via the cache coherency protocol associated with the system. The system 10 returns a coherent signal to indicate that the coherent data fill is the coherent copy. The coherent signal can be provided before, after or concurrently with the coherent data fill. Based on the type of request, the cache coherency protocol can continue executing to change states of one or more copies of the memory block in the system.

Once the coherent signal is received, the source processor can determine whether the current speculative fill employed by the processor to continue execution is the same as the coherent data fill. If the coherent data fill is different from the speculative fill, the processor can back up and re-execute program instructions with the new data. If the coherent data fill is the same as the speculative fill, the processor can continue execution, thus mitigating latency caused by the processor remaining in an idle state until a coherent version of the requested memory block is received.

Figure 2:
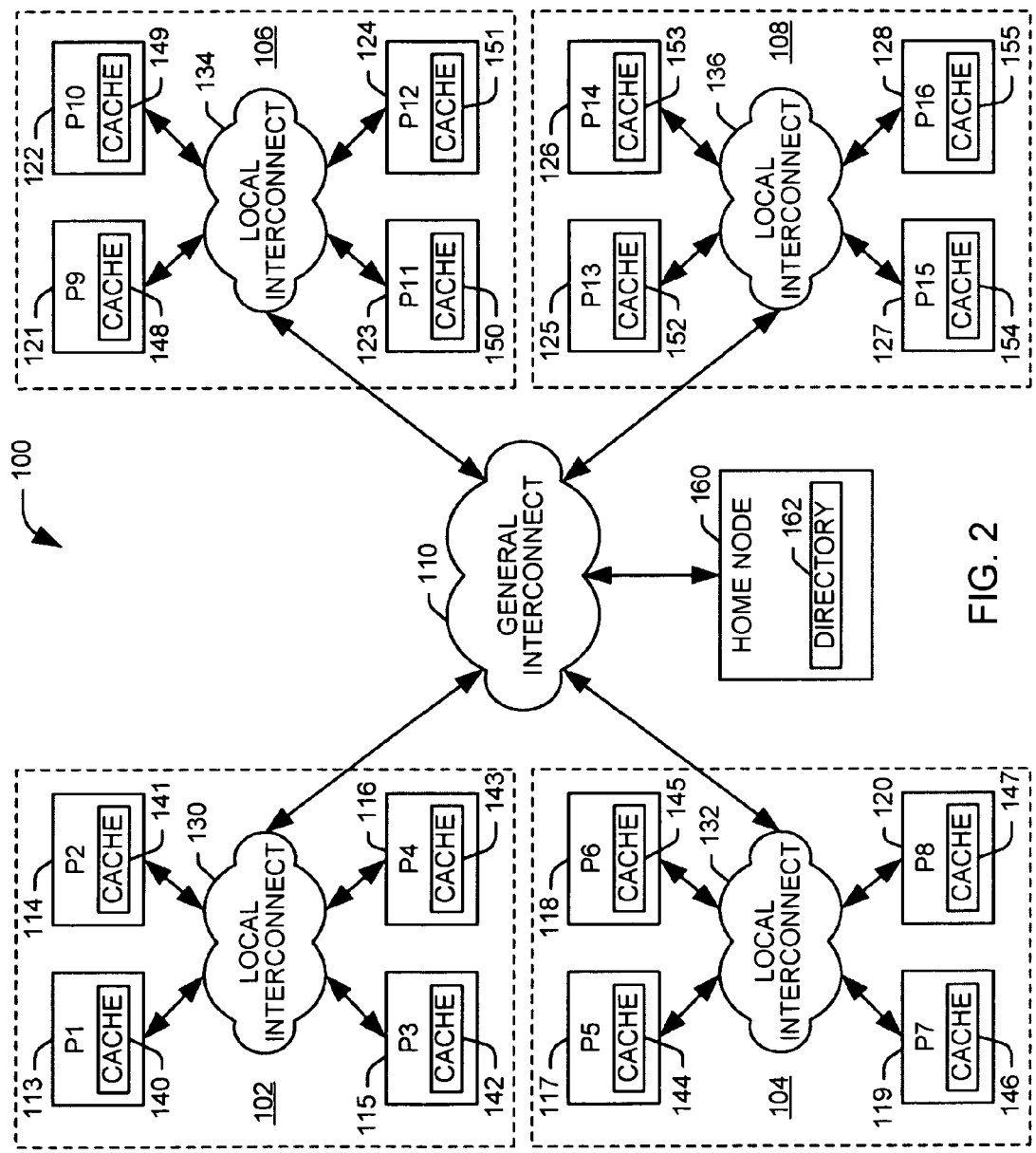
FIG. 2 depicts an example of another multiprocessor system.

FIG. 2 depicts an example of a multi-processor computing system 100. The system 100, for example, includes four SMP (symmetric multi-processor) nodes 102, 104, 106, and 108 in communication with each other via a general interconnect 110. For example, the general interconnect 110 can be implemented as a switch fabric or hierarchical switch programmed and/or configured to manage transferring requests and responses among the nodes 102-108 and between a given node and one or more main memory structures. The main memory can comprise a central memory structure or it can be distributed throughout the system at one or more nodes. While four multi-processor nodes are depicted in the example of FIG. 2, those skilled in the art will appreciate that a greater or smaller number of nodes can be implemented within the system 100.

Each of the multi-processor nodes 102-108 includes a subset of a plurality of associated processors (P1-P16) 113-128, with each subset of processors being interconnected by respective local interconnects 130, 132, 134, and 136. In the example of FIG. 2, a given node (e.g., 102) has four associated processors, but it will be appreciated that a node can have more or less than four associated processors and that the number of associated processors can differ across the multi-processor nodes 102-108. The local interconnects 130-136 facilitate the transfer of data between the processors in their respective nodes.

Each processor 113-128 also includes an associated cache 140-155. The caches 140-155 can enable faster access to data than is available from the main memory. A given cache (e.g., 140) can contain one or more blocks of memory from the main memory. A memory block can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory.

The system 100 implements a cache coherency protocol designed to guarantee coherency of data across the main memory and the plurality of caches 140-155 such that a request to the memory will always return a coherent copy of the desired data. The example illustrated in FIG. 2 is a directory-based protocol, so the multi-processor nodes 102-108 are operative to communicate with a home node 160 that includes memory and an associated directory 162. The directory 162 indicates where a coherent copy of desired data should reside in the system 100. The coherent copy of data, for example, may reside in the main memory or, alternatively, in one of the caches 140-155. For example, a copy of a memory block stored within a cache (e.g., 140) can be modified by a processor (e.g., 113) associated with the cache. These modifications will not be reflected in memory until the processor 113 writes the modifications back to the memory. The cache coherency protocol prevents a second processor (e.g., 120) from reading the outdated version of the memory line in the memory.

Accordingly, when a source processor (e.g., 113) requires a memory block not found in its associated cache 140 (e.g., a cache miss is registered), the processor 113 issues a speculative request and a system request for the data. The requests can be sent concurrently or sequentially. In the illustrated example, the speculative request is a targeted source request provided to the processors (e.g., 114-116) within its associated node (e.g., 102) of the source processor 113, referred to as local processors. The targeted source request is broadcast to the processors 114-116 local to the source processor 113 through the local interconnect 130 associated with the node 102. In response to the targeted request, the local processors 114-116 search their associated caches 141-143 for the desired memory block. Any processor having a cached copy of the memory block returns the copy to the source processor 113 as a data fill. If none of the local processors 114-116 have a cached copy of the requested memory block, the system can obtain a coherent fill of the data via the cache coherency protocol of the system.

It will be appreciated that the speculative source request operates outside of the cache coherency protocol of the system. Accordingly, a data fill returned by a local processor (e.g., 114) in response to a speculative source request is not necessarily a coherent copy of the desired memory block. Another processor (e.g., 120) elsewhere in the system may have modified the memory block since the local processor 114 retrieved its cached copy. Since the coherency of a data fill received from the local processors is uncertain, it is referred to as a speculative fill. A speculative fill allows the source processor 113 to continue to execute instructions associated with the desired memory block with a copy that is believed to be coherent until a coherent copy can be obtained. A copy of the speculative fill can be saved in a missed address file (MAF) entry associated with the request.

A system source request (e.g., a read request or write request) is also sent by the source processor 113 to the home node 160 through the general interconnect 110. In a directory based protocol, the home node 160 retrieves the state of the memory block and the location of an owner node or processor associated with the coherent copy from the directory 162. The home node 160 then provides a forwarding signal to an owner node. The owner node or processor returns a coherent copy of the desired memory block to the source processor as a coherent data fill. The cache coherency protocol implemented in the system 100 ensures that a correct copy of the data is returned in response to the source request. The system 100 also returns a coherent signal that indicates that the copy returned from the owner processor is the coherent version of the requested data.

Once the coherent signal is received, the source processor 113 can determine whether the current speculative fill employed by the source processor to continue execution is the same as the coherent data fill. If the coherent data fill is different from the speculative fill, the processor can back up and re-execute program instructions with the new data. For example, one or more structures (e.g., memory cache structures) can be utilized to preserve the state of the source processor at the time of the speculative fill, including the values at its registers at the time of the speculative fill and the subsequent changes to the associated cache. This information can be used to restore the processor to that state. If the coherent data fill is the same as the speculative fill, the processor can continue execution of new program instructions.

It will be appreciated that additional speculative fills can be provided in response to the system source request. For example, one or more processors (e.g., 122), memory structures, or dedicated speculative guess structures (not shown) having copies of the desired memory block can provide their copies as additional speculative fills. These subsequent data fills can be ignored. Alternatively, if the subsequent data fill is different from the speculative fill used by the source processor to continue execution, the processor backup and re-execute program instructions. This may be the case if it is determined that a subsequent fill is more likely coherent than the original fill employed by the processor to continue execution.

Figure 3:
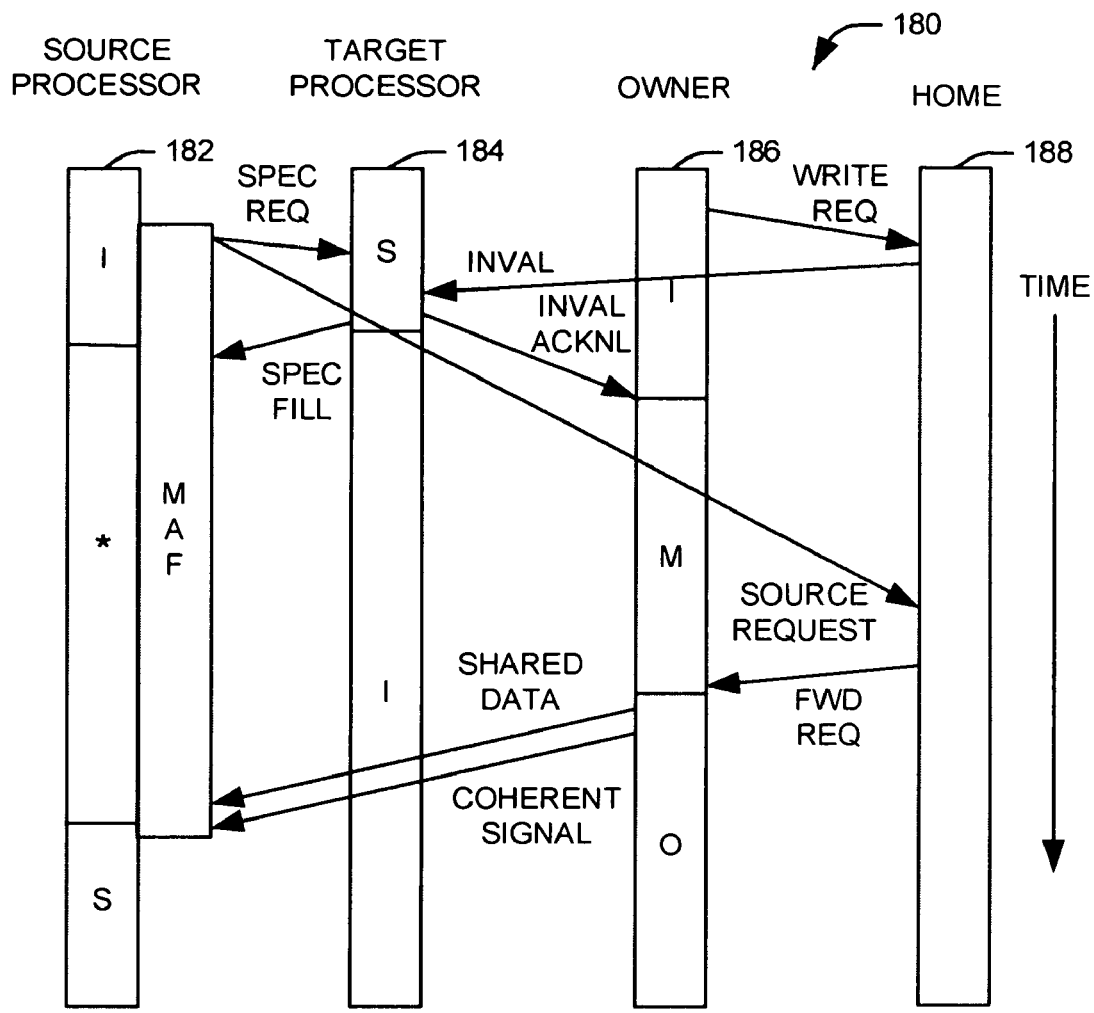
FIG. 3 illustrates a state diagram associated with a source read request.

FIG. 3 illustrates a network 180 having a source processor 182, a target processor 184, an owner node 186, and a home node 188. FIG. 3 illustrates various interrelationships between requests and responses and state transitions that can occur for a given memory address in different memory devices or caches. In the example, time flows in the direction of an arrow labeled "TIME." The illustrated relationships focus on the acquisition of a cache line from the owner node 186 by the source processor 182 via a source read request. A given cache line can assume a number of states with respect to the source processor 182, the target processor 184, and the owner node 186 and other processors in the system. These states are summarized in the following table:

TABLE 1

| STATE | DESCRIPTION |
|---|---|
| I | Invalid The cache line is not present in the processor cache. |
| S | Shared - The cache line is valid and unmodified by caching processor. Other processors may have valid copies. |
| E | Exclusive - The cache line is valid and unmodified by caching processor. The caching processor has the only cached copy in the system. |
| O | Owned - The cache line is valid and more up to date than memory. The caching processor may have modified the cache line. Other processors may have valid copies. |
| M | Modified - The cache line is valid and has been modified by the caching processor. The caching processor has the only cached copy in the system. |

In the illustrated example, the cache line is initially shared by at least the target processor 184 and the owner node 186, with source processor 182 lacking a valid copy of the cache line. The owner node 186 issues a write request to the home node to enable it to modify the cache line. The home node 188 provides an invalidation signal to the nodes and processors having a shared state with respect to the cache line, including the target processor 184.

It will be appreciated that the transmission of the invalidate signal to the target processor is not instantaneous. Before it is received, the source processor can experience a cache miss for the cache line. In response to the cache miss, the source processor 182 generates a speculative fill request to the target processor 184 in response to a cache miss on the cache line. The target processor 184 provides its shared copy of the cache line to the processor 182 as a speculative fill. The pre-fetched copy is a speculative fill because the fill takes place outside of the cache coherency protocol and it is thus uncertain if the shared copy is coherent. The source processor 182 uses the provided speculative fill to continue executing program instructions, but also generates a source request to a home node 188 to request a coherent copy of the cache line.

The target processor 184 then receives the invalidation signal from the home node 188. In response to the signal, the target processor 184 invalidates its copy of the cache line and acknowledges the invalidate signal to the owner node 186. The owner node 186 can then modify the cache line, causing the cache line to assume a modified state. Some time later, the home node 188 then receives the source request from the source processor. The home node or processor 188 determines the owner 186 of the cache line requested from a home directory, and forwards the request to the owner 186. The owner 186 replies by providing a coherent fill of the requested cache line to the source processor 182. The cache line then assumes an owned state with respect to the owner node 186, as the owner node no longer has an exclusive copy of the cache line, but still has a copy more recent than that in memory. The modified data can be written back to memory in accordance with a cache coherency protocol.

A coherent signal accompanies the coherent fill of the cache line provided to the source processor 182. The coherent signal provides an indication to the source processor 182 that the copy provided by the owner 186 is the coherent version of the cache line. In the example of FIG. 3, the coherent signal is provided by the owner 186. However, the coherent signal can be provided by control logic associated with the multi-processor system, by the home node or processor 188 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

Once the source processor 182 receives the coherent signal, the source processor has a verified copy of the cache line shared with at least the owner node. A comparison of the coherent fill and the speculative fill provided by the target processor 184 is performed to determine the coherency of the speculative fill. If the coherent data fill is different from the speculative fill, the source processor 182 can back up to its state prior to the speculative fill and start executing again with the coherent data. If the coherent data fill is the same as the speculative fill, the source processor can continue execution. Since in the illustrated example, the cache line had been modified before the resolution of the source request by the source processor 182, it may be necessary for the source processor to back up and reexecute program instructions using the coherent copy of the data.

Figure 4:
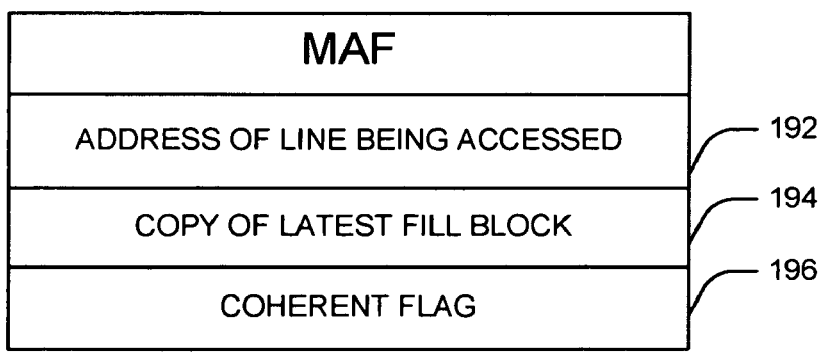
FIG. 4 illustrates a block diagram of a miss address file (MAF) entry.

FIG. 4 illustrates a block diagram of a miss address file (MAF) entry 190 that can be employed to track data fills received in response to a speculative source request and a system source request. A MAF entry is generated by a source processor each time the source processor registers a cache miss. The MAF entry 190 contains fields associated with outstanding source requests (e.g., speculative and system) corresponding to respective cache lines. The MAF fields can include the cache line address being requested 192, the copy of the latest fill block 194 returned by the system and a flag 196 that provides an indication of whether or not the coherent signal has been received. Other entries or fields can be employed to maintain information associated with a given cache line broadcast request.

During operation, the field for the latest fill block 194 is filled by a speculative fill from another processor, if a processor is available having the desired data. Otherwise, the entry is filled by a first response from a system source request. A system source request can produce multiple responses, including a coherent fill of the data and one or more speculative fills from other processor caches. Each time a new fill is received, the source determines if the new data fill is the same as the data fill in the MAF entry 190. If the new fill is different, the source replaces the previous data fill with the new fill. If the new data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 196 has changed indicating that the coherent signal has been received. Once the coherent flag 196 changes state, the source can compare the coherent fill 194 stored in the MAF entry 190 with the speculative fill used to continue execution of the processor to determine if execution should continue or whether the processor needs to re-execute the program instructions.

Figure 5:
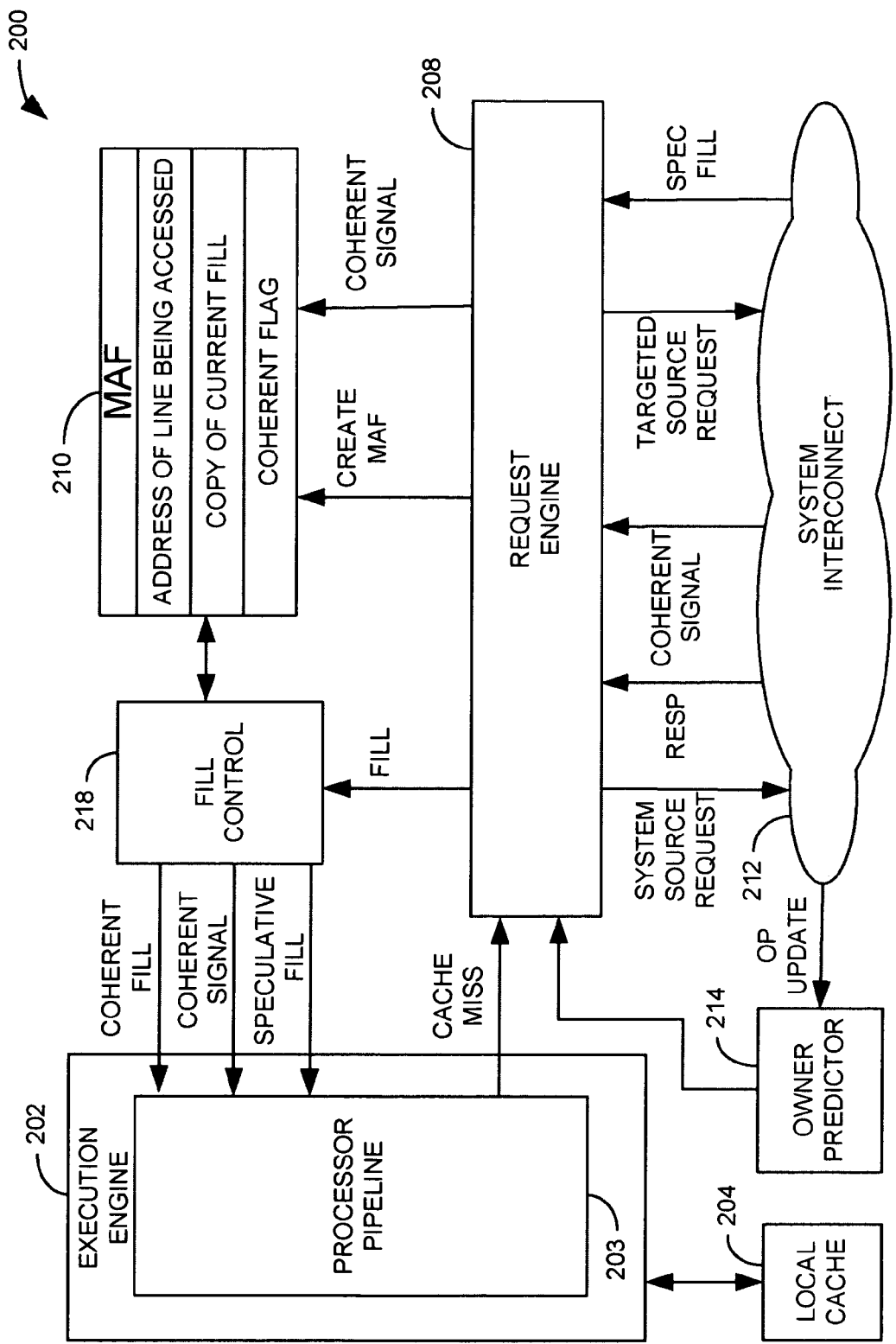
FIG. 5 depicts an example of a processor system.

FIG. 5 illustrates a processor system 200 that employs a multiple fill request arrangement. The system 200 includes an execution engine 202 that executes program instructions associated with a processor pipeline 203. During a load or store instruction, the execution engine 202 searches a local cache 204 to determine if a desired cache line resides in the local cache 204. If the cache line does not reside in the local cache 204, the execution engine 202 initiates a cache miss to a request engine 208. The request engine 208 creates a MAF entry 210 in response to the cache miss. The MAF entry 210 can be implemented as a table, an array, a linked list or other data structure programmed to manage and track requests for each cache line. The MAF entry 210 includes fields that identify, for example, the address of the data being requested, the type of request, and response information received from other nodes in response to the request. The request engine 208 thus employs the MAF entry 210 to manage requests issued by the request engine 208 as well as responses to such requests.

In response to the cache miss, the request engine 208 generates two requests for the desired cache line. One request is a speculative request, broadcast to one or more processors or nodes through a system interconnect 212. In one implementation, one or more targeted processors for the speculative request can be preselected for a given source processor according to certain advantageous properties, such as locality to the source processor or similar properties contributing to low latency. Alternatively, the speculative request can be sent to every processor in the system.

In the illustrated example, a set of target processors for the request can be provided by an owner predictor 214 operatively connected to the request engine 208. The owner predictor 214 can be implemented as a cache-like structure having one or more entries identifying respective cache lines. Each entry can contain the identity a cache within the system likely to contain a coherent copy of the cache line. The owner predictor 214 can be periodically updated by an owner predictor control (not shown) at a system directory through a system interconnect 212 to reflect recent changes in ownership among the cache lines within the system. For example, each time a one or more processors acquire a coherent (e.g., shared, modified, or exclusive) cached copy of a cache line, an entry can be written to the owner predictor 214 identifying the cache line and processors having valid cached copies. Older entries can be overwritten according to a First-In-First-Out (FIFO) arrangement.

The owner predictor control can provide continuing updates to the owner predictor 214. For example, the owner predictor update control 86 can broadcast an update message to the owner predictor 214 associated with the processor 200 and, optionally, one or more owner predictors associated with other processors each time the system directory records a cache line entering an exclusive or modified state with respect to another processor. As another alternative, the owner predictor update control can implement updates intermittently (e.g., at predetermined time intervals). In the illustrated system, however, information concerning the location of valid shared copies of the cache line is helpful in determining target processors. The owner predictor control can therefore provide an update to the owner predictor 214 each time one or more processors acquire a coherent cached copy of the cache line. Accordingly, the owner predictor 214 can contain substantially current information as to the location of any coherent copies of the desired cache line.

In response to the speculative request, the processors search their respective caches for a copy of the desired cache line. If a copy is available, it is provided to a fill control component 218 through the request engine 208 as a speculative data fill. The speculative fill is stored in a copy of the latest fill block field in the MAF entry 210 by the fill control 218. The fill control component 218 provides the speculative fill to the processor pipeline 203. The processor pipeline 203 employs the speculative fill to continue execution of program instructions.

The request engine 208 also sends a system source request to obtain a coherent copy of the cache line. In response to the system source request, the system can provide a number of additional data fills to the request engine 208. As new fills are received from the system, the fill control 218 continues storing the new fills in the copy of the latest fill block field of the MAF entry 210 overwriting the previous fills if the new fill is different than the fill in the copy of the latest fill block. These subsequent data fills can be ignored. Additionally, if the subsequent data fill is different from the speculative fill used by the source processor to continue execution, the processor backup and re-execute program instructions. This may be the case if it is determined that a subsequent fill is more likely coherent than the original fill employed by the processor to continue execution.

The fill control component 218 monitors a coherent flag field in the MAF entry 210 to determine if the coherent flag has changed state, which is an indication that the coherent signal has been received. Once the coherent signal is received from the system, the request engine 208 changes the state of the coherent flag field in the MAF entry 210.

The fill control 218 detects the change in the state of the coherent fill and retrieves a copy of the latest fill block, which corresponds to the coherent version of the data fill. The fill control 218 then compares the speculative fill provided to the processor pipeline 203 with the coherent fill. If the coherent data fill is different from the speculative fill, the fill control 218 provides the coherent fill to the processor pipeline 203. The processor pipeline 203 can back up and start executing program instructions again with the new coherent data. If the coherent data fill is the same as the speculative fill, the fill control 218 provides the coherent signal to the processor pipeline 203 indicating that the processor pipeline 203 has already been provided with the coherent data. The processor pipeline 203 can continue execution, until another load or store instruction is encountered.

Figure 7:
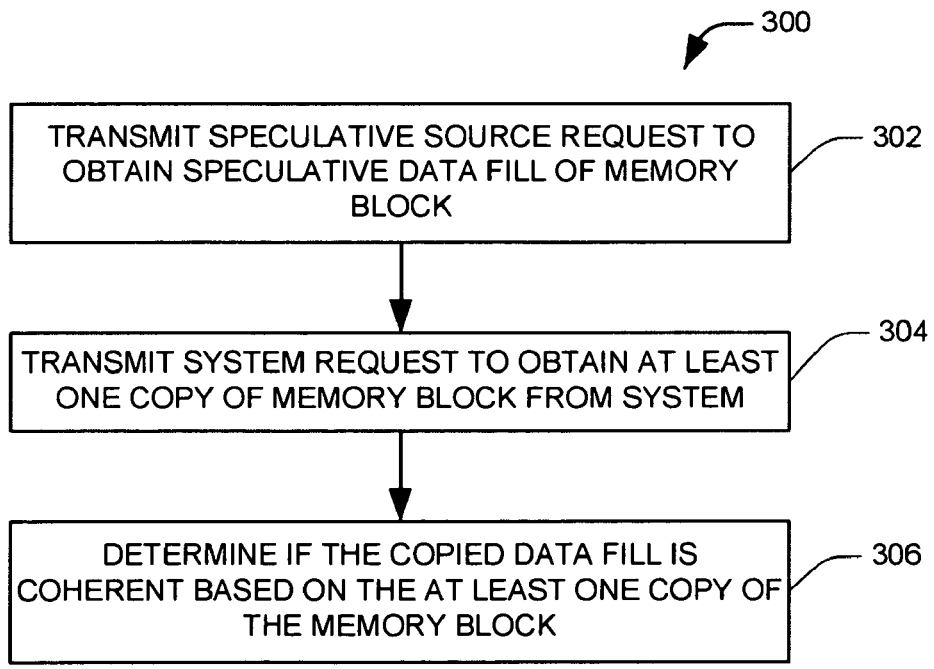
FIG. 7 depicts a flow diagram illustrating another method associated with a source request.
Figure 6:
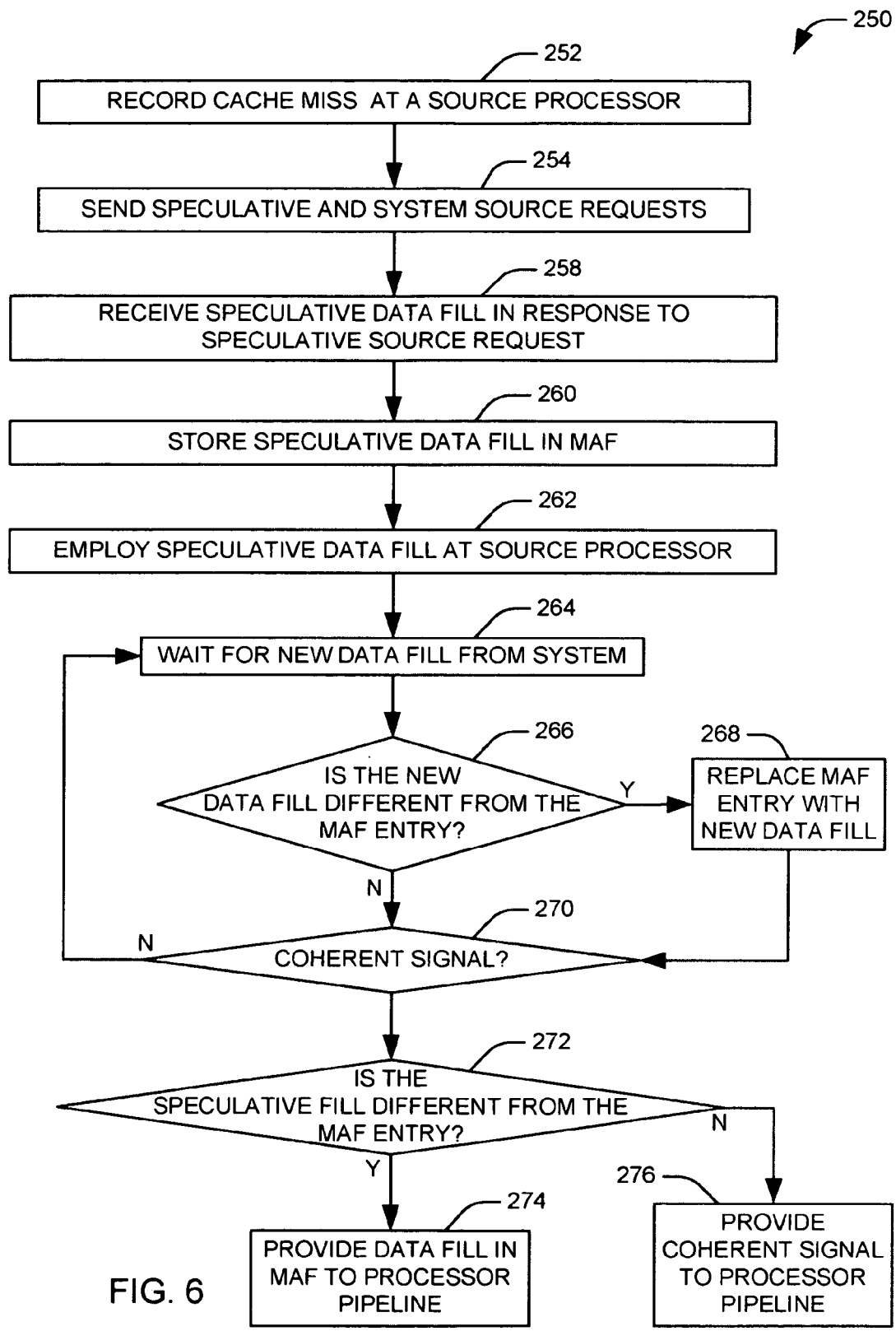
FIG. 6 depicts a flow diagram illustrating a method associated with a source request.

In view of the foregoing structural and functional features described above, certain methods will be better appreciated with reference to FIGS. 6 and 7. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 6 depicts a method employing a speculative fill in the event of a local cache miss in a multi-processor system. The method begins at 252, where a load or store instruction of a processor pipeline causes a cache miss at a source processor. At 254, the source processor generates a system source request and a speculative source request. The speculative source request can be provided as a broadcast to one or more processors outside of the normal cache coherency protocol of the system. The one or more processors can comprise one or more selected target processors, or can simply encompass all processors in the system. The system source request is provided to the system in accordance with a cache coherency protocol associated with the system. For example, the system source request can be directed to a home node associated with the desired data. It will be appreciated that the speculative and system source requests can be generated sequentially in any order, or in parallel.

The speculative data fill is provided to the source processor from one or more processors in response to the first source request at 258. The method then advances to 260, where the speculative data fill is copied in the MAF. At 262, the source processor pipeline begins execution employing the speculative fill. The method then proceeds to 264, where the source processor waits for one or more data fills from the system in response from the second source request. When a data fill is received from the system, the new fill is compared to the MAF entry associated with the source request at 266. If it is different, the new fill replaces the existing MAF entry at 268 and the method advances to 270. If the MAF entry is identical to the new data fill, the method proceeds directly to 270.

At 270, the source determines if a coherent signal has been received. For example, the source can determine if a coherent signal has been received by determining if a coherent flag residing in the MAF entry has changed state. If the coherent signal has not been received, the method returns to 264 to wait for a new data fill from the system. If the coherent signal has been received, the methodology proceeds to 272. At 272, the source processor compares the fill stored in the MAF entry (coherent fill) with the speculative fill provided to the processor pipeline. If the speculative fill is not the same as the coherent fill, the method proceeds to 274 to provide the fill from the MAF entry to the processor pipeline. If the speculative fill is the same as the coherent fill, the method proceeds to 276 to provide the coherent signal to the processor pipeline. If the processor pipeline receives a new fill, the processor pipeline can back up and start executing again with the new data. If the processor pipeline receives a coherent signal without a new fill, the processor pipeline can continue executing.

FIG. 7 illustrates a method 300 for providing fill data to a source processor. At 302, a speculative source request for a memory block is transmitted from a source location to obtain a speculative data fill of the memory block. A second source request for a memory block is transmitted from the source location at 304 to obtain at least one copy of the memory block. It is then determined at 306 if the speculative data fill is coherent based on the at least one copy of the memory block.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system comprising:
a source processor that generates and transmits both a speculative source request and a system source request in response to a cache miss, such that the speculative source request and the system source request are pending concurrently;
at least one processor that provides a speculative data fill to a source processor in response to the speculative source request; and
the multi-processor system providing a coherent data fill to the processor in response to the system source request.

2. The system of claim 1, the source processor continuing to execute program instructions employing the speculative data fill until the coherent data fill is received, and the source processor re-executing program instructions if the coherent data fill is different from the speculative fill.

3. The system of claim 1, the processing system providing a plurality of data fills to the source processor and providing a coherent signal that indicates which of the plurality of data fills is the coherent data fill.

4. The system of claim 3, the plurality of data fills comprising a subsequent speculative fill, the source processor continuing to execute program instructions if the subsequent speculative data fill is the same as the original speculative fill, the source processor re-executing program instructions if the subsequent speculative data fill is different from the original speculative fill.

5. The system of claim 3, the source processor having a request engine that generates a miss address file (MAF) entry associated with the cache miss, the MAF entry having a data fill field and a coherent flag field that indicates if the coherent signal has been received by the source processor.

6. The system of claim 5, the request engine storing the latest data fill received by the source processor in the data fill field if it is different from a previously stored data fill and changing the state of the coherent flag field in response to receipt of the coherent signal by the source processor.

7. The system of claim 6, further comprising a fill control component that retrieves a copy of the latest data fill associated with the coherent data fill in response to a change in state of the coherent flag, and compares the copy of the coherent data fill with the speculative fill provided to a processor pipeline associated with the source processor, the fill control providing the copy of the coherent data fill to the processor pipeline if the speculative fill is the same as the coherent data fill and providing the coherent signal to the processor pipeline if the speculative fill is the not the same as the coherent data fill.

8. The system of claim 1, the speculative source request being provided as a source broadcast to a plurality of processors.

9. The system of claim 1, the speculative source request comprising a targeted source request provided to at least one target processor.

10. The system of claim 9, the at least one target processor including at least one processor local to the source processor.

11. The system of claim 9, further comprising an owner predictor that selects at least one of the at least one target processors according to activity within the multi-processor system.

12. The system of claim 11, the owner predictor receiving periodic updates from the system, the updates identifying at least one memory block and the location of a coherent copy associated with each memory block.

13. The system of claim 12, a given update being provided in response to a change in the state of a memory block associated with the system.

14. The system of claim 12, the periodic updates being provided by an owner predictor control associated with a system directory.

15. The system of claim 12, a given update being provided in response to an acquisition of a coherent cached copy of the memory block by a processor within the multi-processor system.

16. A multi-processor system, comprising:
a source processor that generates and transmits both a first source request and a second source request in response to a cache miss, such that the first source request and the second request are pending concurrently;
at least one processor coupled to the source processor through a local interconnect that provides a speculative data fill to the source processor in response to the first source request; and
the multi-processor system providing a coherent data fill through a system interconnect to the source processor in response to the second source request.

17. The system of claim 16, the source processor employing the speculative fill to continue to execute program instructions until the coherent data fill is received by the source processor.

18. The system of claim 16, the source processor having an associated fill control that compares the coherent data fill to the speculative data fill to determine if the speculative data fill is coherent.

19. The system of claim 18, the source processor returning to a previous state of execution and executing program instructions with the coherent data fill if the speculative fill is not coherent.

20. A multi-processor system comprising:
means for generating and transmitting both a speculative source request and a system source request in response to a cache miss, such that the speculative source request and the system source request are pending concurrently;
means for providing a speculative data fill from at least one target processor in response to the speculative source request;
means for executing program instructions with the speculative data fill;
means for providing a coherent data fill in response to the system source request;
means for determining if the speculative data fill received from the at least one target processor represents coherent data; and
means for providing the coherent data fill to the means for executing if the speculative data fill from the at least one target processor does not represent coherent data.

21. The system of claim 20, the means for determining comprising means for providing a coherent signal that indicates if the retrieved speculative data fill represents coherent data.

22. The system of claim 20, wherein the means for executing program instructions re-executes program instructions with the coherent data fill if the speculative data fill does not represent coherent data.

23. A method comprising:
generating and transmitting both a speculative source request and a system source request from a source location in response to a cache miss, such that the speculative source request and the system source request are pending concurrently;
executing program instructions with a speculative data fill received in response to the speculative source request; and
determining if the speculative data fill is coherent based on a coherent signal that is received at the source location in response to the system source request.

24. The method of claim 23, the transmitting of the speculative source request comprising broadcasting a source broadcast request.

25. The method of claim 23, wherein the coherent signal which of a plurality of data fills received in response to the speculative source request and the system source request is a coherent data fill.

26. The method of claim 23, where determining if the speculative data fill is coherent includes comparing a coherent data fill to the speculative data fill.

27. The method of claim 23, wherein the executing program instructions comprises executing program instructions with the speculative data fill at a source processor associated with the source location before it is determined if the speculative data fill is coherent.

28. The method of claim 27, further comprising continuing to execute program instructions at the source processor if the speculative data fill is determined to be coherent, and re-executing program instructions at the source processor with a new data fill if the speculative fill is determined not to be coherent.

29. The method of claim 23, providing a coherent signal to the source location comprising providing a coherent signal one of prior to, after and concurrently with a coherent data fill.

30. The method of claim 23, further comprising:
generating a miss address file (MAF) entry associated with the speculative and system source requests;
storing the speculative data fill received by the source location in response to the speculative source request in a first field in the MAP entry;
monitoring a state of the coherent flag in a second field of the MAF to determine if the coherent signal has been received; and
repeatedly overwriting the speculative data fill in the first field with a latest copy of the speculative data fill received in response to the speculative source request if the latest copy is different than a previously stored copy, until the coherent flag has changed states.

* * * * *

UNITED STATES PATENT AND TRADEMARK OFFICE
CERTIFICATE OF CORRECTION

PATENT NO. : 7,380,107 B2  Page 1 of 1
APPLICATION NO. : 10/756640
DATED : May 27, 2008
INVENTOR(S) : Simon C. Steely, Jr. et al.

It is certified that error appears in the above-identified patent and that said Letters Patent is hereby corrected as shown below:

In column 12, line 46, in Claim 7, after "fill is" delete "the".

In column 14, line 18, in Claim 25, after "signal" insert -- indicates --.

In column 14, line 46, in Claim 30, delete "MAP" and insert -- MAF --, therefor.

Signed and Sealed this

Ninth Day of March, 2010

David J. Kappos
*Director of the United States Patent and Trademark Office*